United States Patent [19]
Ogura

[11] Patent Number: 5,296,978
[45] Date of Patent: Mar. 22, 1994

[54] INFORMATION SIGNAL REPRODUCING APPARATUS

[75] Inventor: Tokihiko Ogura, Kanagawa, Japan

[73] Assignee: Canon Kabushiki Kaisha, Tokyo, Japan

[21] Appl. No.: 1,897

[22] Filed: Jan. 7, 1993

Related U.S. Application Data

[63] Continuation of Ser. No. 875,201, Apr. 24, 1992, abandoned, which is a continuation of Ser. No. 239,790, Aug. 1, 1991, which is a continuation of Ser. No. 682,399, Apr. 5, 1991, abandoned, which is a continuation of Ser. No. 565,212, Aug. 8, 1990, abandoned, which is a continuation of Ser. No. 237,217, Aug. 26, 1988, abandoned.

[30] Foreign U.S. Application Data

August 31, 1987 [JP] Japan ............... SH062-215174
August 31, 1987 [JP] Japan ............... SH062-215175

[51] Int. Cl.$^5$ .......................................... G11B 5/09
[52] U.S. Cl. ................................... 360/67; 360/65
[58] Field of Search ............................ 360/65, 67

[56] References Cited

U.S. PATENT DOCUMENTS

| | | | |
|---|---|---|---|
| 4,314,287 | 2/1982 | Freeman et al. | 360/67 |
| 4,564,869 | 1/1986 | Baumeister | 360/65 |
| 4,805,047 | 2/1989 | Nasu et al. | 360/67 |

OTHER PUBLICATIONS

Electronic Designers' Handbook by Robert W. Landeee et al., ©1957 McGraw-Hill Book Co. Inc. pp. 17-4-17-18.

*Primary Examiner*—Vincent P. Canney

[57] ABSTRACT

An information signal reproducing apparatus for reproducing from a recording medium information signals recorded on recording tracks formed on the recording medium. The boosting ratio at which an information signal reproduced from the recording medium is boosted before it is output is selected in response to changes in the state of reproduction, thereby minimizing deterioration of the reproduced information signal as well as stabilizing the reproduction operation.

15 Claims, 6 Drawing Sheets

INFORMATION SIGNAL REPRODUCING APPARATUS

This is a continuation application under 37 CFR 1.62 of prior application serial number 875,201, filed Apr. 24, 1992, now abandoned, which is a continuation application under 37 CFR 1.62 of prior application serial number 739,790, filed Aug. 1, 1991, which is continuation application under 37 CFR 1.62 of prior application serial number 682,399, filed Apr. 5, 1991, now abandoned, which is continuation application under 37 CFR 1.62 of prior application serial number 565,212, filed Aug. 8, 1990 now abandoned, which is a continuation, of application Ser. No. 237217, filed Aug. 26, 1988 now abandoned.

BACKGROUND OF THE INVENTION

1. Field of the Invention:

This invention relates to an information reproducing apparatus for reproducing information signals recorded on a recording medium.

Figure 1:
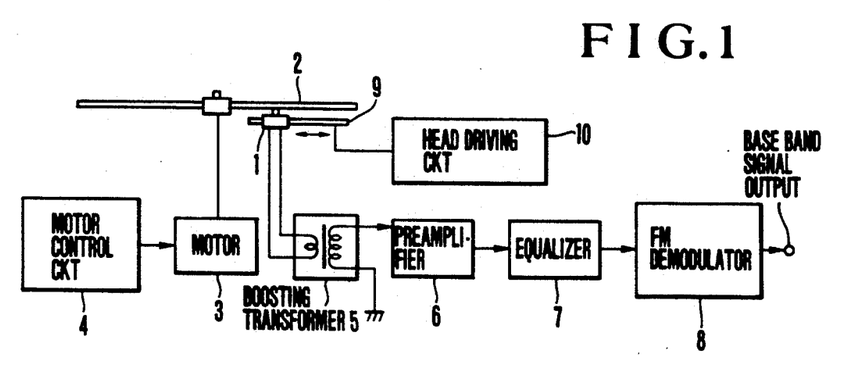
FIG. 1 is a schematic block diagram of the construction of a reproduction system of a conventional still video apparatus.

2. Description of the Related Art:

A still video apparatus shown in FIG. 1 which is an example of this kind of conventional apparatus for reproducing information signals has a reproducing system which makes use of a boosting transformer 5 to improve the signal-to-noise ratio of a reproduction signal if a thin film head or the like is employed as a magnetic head 1. A motor 3 is rotated at a constant speed under the control of a motor control circuit 4. The magnetic head 1 detects a signal from a magnetic recording medium 2 in the form of a disk which is rotated by the motor 3. This signal is boosted by the boosting transformer 5 so as to obtain an optimum carrier-to-noise (C/N) ratio, is amplified by a preamplifier 6, and thereafter undergoes amplitude correction in an equalizer 7, finally being demodulated into a baseband signal by an FM demodulator 6. The magnetic head 1 is capable of moving on a head moving rail 9 in the radial direction of the recording medium 2. The position of the magnetic head 1 is controlled by a head driving circuit 10. The magnetic head 1 is moved on the head moving rail 9 so that it reproduces signals from recording tracks formed on the magnetic recording medium 2.

As is well-known, a relative speed between the disk-like magnetic recording medium and the magnetic head becomes smaller as the head approaches the inner circumference of the recording medium. Correspondingly, the reproduction output is necessarily reduced. If the radius of an outermost recording track of a single magnetic recording medium is 20 mm; the radius of an innermost recording track is 15.1 mm; and the track pitch is 0.1 mm, this recording medium has 50 tracks available for recording. If the rotational speed of the recording medium is 3600 rpm, the speed of the first (outermost) track is 7.54 m/s, and the speed of the fiftieth (innermost) track is 5.69 m/s. The speed of the fiftieth track relative to the magnetic head is lower than that of the first track by 25%. In addition, if the recording frequency is 7 MHz, the recording wavelength is 1.1 μm at the first track and is 0.8 μm at the fiftieth track. The loss depending upon the recording wavelength is greater at the fiftieth track than it is at the first track. As a whole, there is a reduction of more than 25% in the output from the recording medium at the innermost track.

The boosting ratio of the boosting transformer 5 is determined so that the C/N is highest at the innermost track on the magnetic recording medium.

If a head reproduction output is E; the boosting ratio of the boosting transformer is n; the input-conversion noise level of the preamplifier is $N_A$; the level of head impedance noise is $N_h$; and the level of noise including tracing noise and modulation noise generating on the recording medium is $N_m$ (N represents the level of noise certain frequency apart from the carrier, C represents the carrier), the C/N of a carrier having a single carrier frequency is represented by $$C/N \propto \frac{nE}{\sqrt{N_A^2 + n^2(N_h^2 + N_m^2)}} \quad (1)$$

Figure 2:
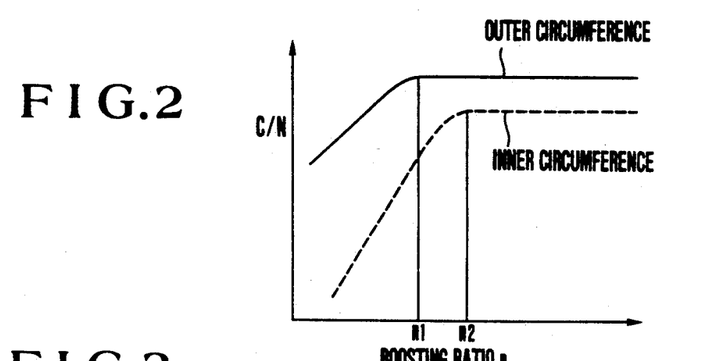
FIG. 2 is a graph of the relationship between the boosting ratio and the C/N.

$N_A$ and $N_h$ are constant with respect to the position of the magnetic head on the recording medium in the radial direction while $N_m$ changes depending upon the radial position of the magnetic head such that it is larger at an outer circumferential position (where the wavelength is longer) than it is at an inner circumferential position (where the wavelength is shorter). Therefore, if $N_A$ and $N_h$ are on the same order, for example, they are several 0.1 nv/√Hz, there are different relationships between n and C/N at the outer and inner circumferences of the recording area on the recording medium, as those shown in FIG. 2, in which the C/N begins to saturate at the outer circumference when n is $n_1$ which is a value smaller than $n_2$ which corresponds to the saturation at the inner circumference. As a result, the boosting ratio is generally set to a value as represented by $n_2$ (relating to the change in C/N at the inner circumference).

However, if the boosting ratio of the boosting transformer is increased, the coupling coefficient tends to become smaller depending upon the form of the transformer or upon how the winding is formed, and the insertion loss thereby increases, resulting in a problem of a deterioration in the transmission characteristics.

To widen the band of recording signals on the recording medium, the resonance-point frequency of the recording head should be heightened as much as possible. It is therefore desired to reduce the inductance of the boosting transformer by minimizing the boosting ratio thereof.

Recently, many attempts have been made to achieve improvements in magnetic recording mediums or circuits for use in magnetic recording/reproduction apparatus for recording or reproducing information signals such as video signals in order to realize recording/reproduction of images with improved image qualities which cannot be achieved by conventional apparatus. In a system generally adopted for this purpose, the carrier frequency of a luminance signal recorded on a magnetic recording medium is increased in order to widen the video signal band and thereby realize image formation with a high degree of resolution.

In this case, many apparatus of this kind are designed, as in the case of a Super-VHS system for a video tape recorder, to provide a compatibility with ordinary conventional apparatus in such a manner that one recording/reproduction apparatus is constituted by two types of systems selectively used: one in which recording or reproduction is performed with the same frequency deviation as that of the conventional apparatus; and one in which the carrier frequency is heightened so as to expand the recording band for recording or reproduction of high-resolution video information.

Figure 3:
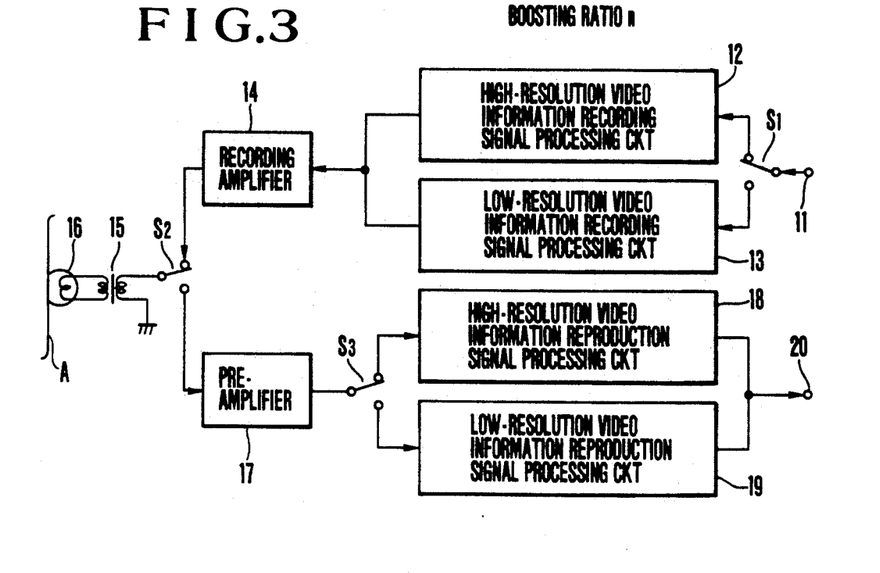
FIG. 3 is a schematic block diagram of the construction of the conventional video tape recorder.

FIG. 3 shows an example of this type of conventional magnetic recording/reproduction apparatus in which a video signal which has been input through a signal input terminal 11 is supplied via a switch $S_1$ to one of a circuit 12 for processing high-resolution video information recording signals and a circuit 13 for processing low-resolution video information recording signals, is amplified by a recording amplifier 14 to a suitable amplitude, and is thereafter supplied as a recording current to a magnetic head 16 via a recording/reproduction change-over switch $S_2$ and a boosting transformer 15 such as a rotary transformer, finally being recorded on a magnetic recording medium A in the form of a tape or disk.

When recording information recorded on the recording medium A in this manner is reproduced, the voltage of a signal detected by the magnetic head 16 is boosted to a suitable level by the boosting transformer 15, and the reproduction signal is thereafter supplied to a pre-amplifier 17 via a switch $S_2$, and is supplied via a switch $S_3$ to a circuit 18 for processing high-resolution video information reproduction signals if the signal contains high-resolution video information or to a circuit 19 for processing low-resolution video information reproduction signals if the signal contains conventional video information, the output from each circuit being output through an output terminal 20.

However, in the above example of the conventional apparatus, it is necessary to employ a recording medium improved in high-band characteristics in order to compensate for a reduction in the output of the high-band components of the video information signal in the high-image-quality mode in which the FM carrier frequency is increased. This is disadvantageous in terms of handling of the recording medium. It is also necessary to employ, as the recording/reproduction head, a narrow-gap head in order to improve the sensitivity in the high band of the video signal as much as possible. On the other hand, however, the use of a narrow-gap head entails a deterioration of the low-band reproduction sensitivity.

SUMMARY OF THE INVENTION

It is an object of the present invention to provided an information signal reproducing apparatus which is designed to overcome the above-described problems.

It is another object of the present invention to provide an information signal reproducing apparatus which is capable of limiting deterioration of reproduced information signals and capable of performing reproduction processing with improved stability irrespective of changes in the state of reproduction.

It is still another object of the present invention to provide an information signal reproducing apparatus which is capable of limiting deterioration of reproduced information signals and capable of performing reproduction processing with improved stability at the time of reproduction of a plurality of types of information signals from a recording medium irrespective of whether or not there are any differences between the frequency bands of these signals.

The present invention therefore provides in one of its aspects an information signal reproducing apparatus for reproducing from a recording medium information signals recorded on recording tracks formed on the recording medium, the information signal reproducing apparatus having:

reproduction means, capable of moving over the recording medium relatively thereto, for reproducing an information signal recorded on each recording track of the recording medium and outputting the information signal thereby reproduced;

boosting means for boosting the information signal reproduced by the reproduction means;

relative speed information detecting means for detecting changes in the speed of the reproduction means relative to the recording medium when the reproduction means traces the tracks of the recording medium, the relative speed information detecting means outputting relative speed information in correspondence with the detected relative speed; and boosting ratio changing means for changing, in response to the relative speed information output from the relative speed information detecting means, the ratio at which the information signal is boosted by the boosting means.

The present invention provides in another of its aspects an information signal reproducing apparatus for reproducing from a recording medium a plurality of types of information signals which are recorded on the recording medium after they have been respectively frequency-modulated by a plurality of carrier frequency signals of different frequencies, the information signal reproducing apparatus having:

reproduction head means for reproducing the plurality of types of information signals recorded on the recording medium;

boosting means for boosting the plurality of types of information signals reproduced by the reproduction head means; and boosting ratio changing means for changing, in response to the frequency of the carrier frequency signal of each information signal reproduced by the reproduction head means, the ratio at which the information signal is boosted by the boosting means.

The above and other objects and features of the invention will become apparent from the following detailed description of embodiments thereof taken in connection with the accompanying drawings.

Detailed Description of the Preferred Embodiments

The present invention will be described below in detail with respect to embodiments thereof.

Figure 4:
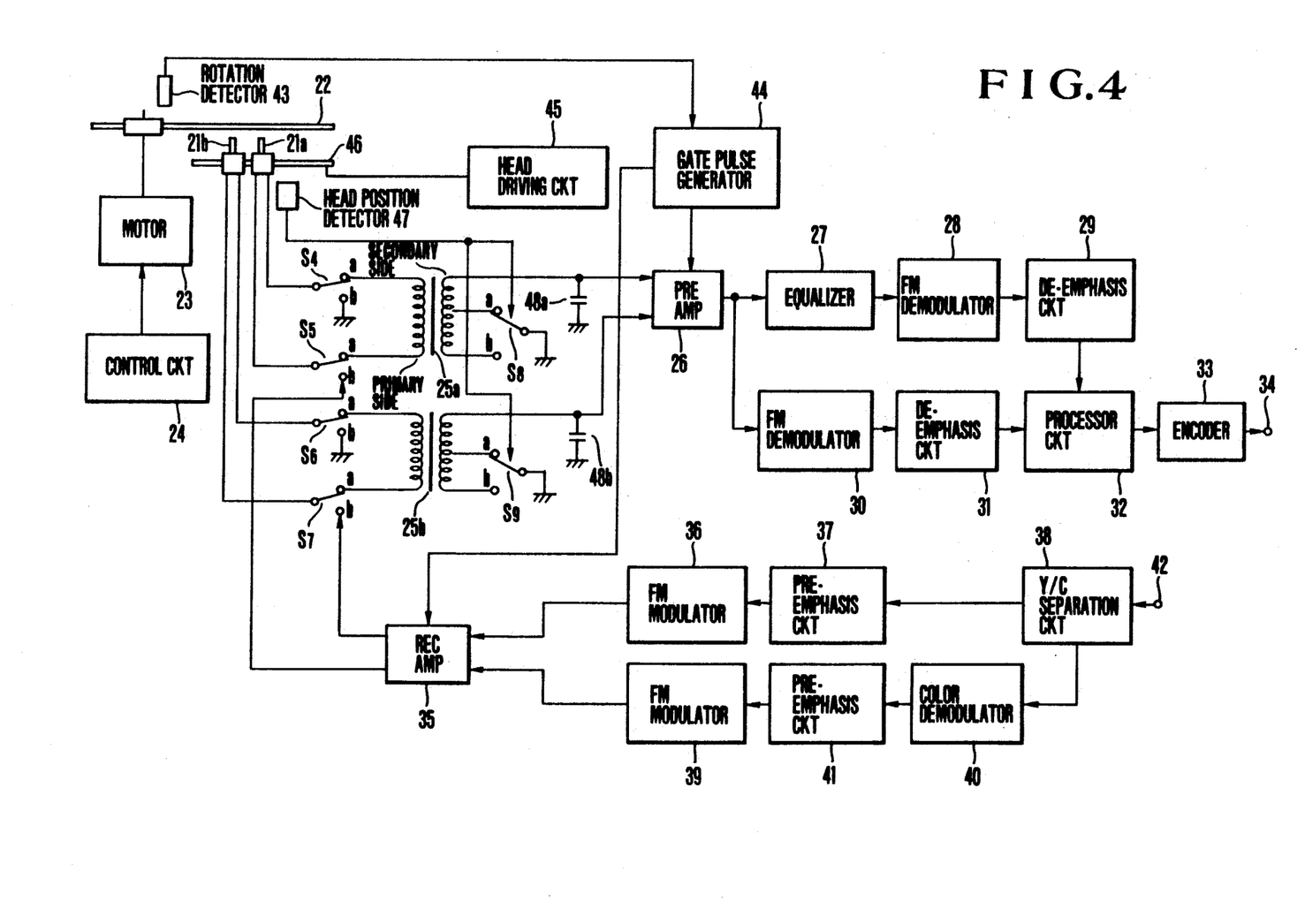
FIG. 4 is a schematic block diagram of the construction of a still video apparatus which represents a first embodiment of the present invention.

FIG. 4 schematially shows the construction of a still video apparatus which represents a first embodiment of the present invention and which has thin film magnetic heads 21a and 21b (in which the number of turns is seven). The magnetic head 21a constitutes a first head for a channel A while the magnetic head 21b constitutes a second head for a channel B. A sheet of magnetic recording medium 22 (hereinafter referred to as "magnetic sheet") is rotated by a driving motor 23 under the control of a motor control circuit 24. A first boosting transformer 25a inserted in the channel A and a second boosting transformer 25b inserted in the channel B are connected to the first head 21a and the second head 21b, respectively. The still video apparatus also has a preamplifier 26; a luminance signal equalizer 27; an FM demodulator 28; a de-emphasis circuit 29, a color signal FM demodulator 30, a differential color signal de-emphasis circuit 31; a processor circuit 32 which performs line interpolation and skew correction at the time of field reproduction as well as drop-out correction and an operation of making differential color signals line-simultaneous; an NTSC encoder 33; a video signal output terminal 34; a recording amplifier 35; an liminance signal FM modulator 36; an luminance signal pre-emphasis circuit 37; an Y/C separation circuit 38 which separates an luminance signal (Y) and a color signal (C) from a video signal; an FM modulator 39 which frequency-modulates a differential color signal; a color demodulator 40 which forms R-Y and B-Y signals from a carrier chrominance dignal; a differential color signal pre-emphasis circuit 41; a video signal input terminal 42; a rotation detector 43 which detects a PG pin of the magnetic sheet 22 and outputs a detection pulse each time the sheet 22 makes one round; and a gate pulse generator 44 which shapes pulses supplied from the detector 43. The gate pulse generator 44 generates, during recording, gate pulses to switch currents which flow through the magnetic heads 21a and 21b every unit field period. During reproduction, the gate pulse generator 44 generates, in the case of frame reproduction, pulses to switch the outputs from the magnetic heads 21a and 21b each time the magnetic sheet 22 makes a round, or it generates, in the case of field reproduction, a high- or low-signal to select one of the magnetic heads 21a and 21b.

The still video apparatus further has a head driving circuit 45, a head moving rail 46, a head position detector 47, a resonance capacitor 48a in the channel A, a resonance capacitor 48b in the channel B, recording/reproduction change-over switches S4 to S7, and switches S8 and S9 for changing the boosting ratios depending upon whether the head is located on the side of the inner circumference or outer circumference of the magnetic sheet 22.

The operation of the apparatus shown in FIG. 4 will be described below.

At the time of recording, each of the switches S4 to S7 is changed over to establish connection to terminal b in response to a signal supplied from a main control circuit (not shown) which performs overall control of the system. A TV signal based on the NTSC system is input through the input terminal 42 and is separated by the Y/C separation circuit 38 into a luminance signal Y+S containing a synchronizing signal, and a carrier chrominance signal C. The luminance signal undergoes emphasis in the pre-emphasis circuit 37, and the luminance signal Y+S is frequency-modulated by the FM modulator 36 in a frequency deviation having, for example, a sync tip of 6 MHz and a 100% white level of 7.5 MHz.

The signal C output from the Y/C separation circuit 38 is demodulated by the color demodulator 40 into differential color signals R-Y and B-Y so as to form a color-difference line-sequential signal consisting of signals R-Y and B-Y which alternately take place every line. The color-difference line-sequential signal is supplied from the demodulator 40 to the differential color signal pre-emphasis circuit 41 and undergoes high-band emphasis in this circuit, and the carrier is thereafter frequency-modulated by the FM modulator 39 while setting, for example, a center frequency of 1.2 MHz and a frequency deviation of 700 KHz with respect to the R-Y signal or setting a center frequency of 1.3 MHz and a frequency deviation of 500 KHz with respect to the B-Y signal. A luminance FM signal and a color FM signal output from the FM modulators 36 and 39 are respectively amplified to suitable levels by the recording amplifier 35 and are supplied for one field period from this amplifier to the first head 21a or the second head 21b in the case of frame recording when the recording gate is opened by a signal supplied from the gate pulse generator 44.

The magnetic sheet 22 is rotated at 3,600 rpm by the motor 23 under the control of the motor control circuit 24. During this operation, the motor control circuit 24 is controlled by a signal supplied from the main control circuit (not shown) in such a manner that a certain relationship is established between the phase of the vertical synchronizing signal of the input video signal and the phase of a signal supplied from the rotation detector 43, thereby enabling recording to be always started from the same position on the magnetic sheet 22. The signal from the rotation detector 43 is input into the gate pulse generator 44, and the gate pulse generator 44 outputs, every field, a gate pulse for selecting the first head 21a or second head 21b to the recording amplifier 35 in response to a recording instruction issued from the main control circuit. The recording amplifier 35 thereby supplies, in the case of frame recording, a recording current for the first field to the first head 21a to effect recording on a predetermined track of the magnetic sheet 22, and then supplies a recording current for a second field to the second head 21b on a track of the magnetic sheet 22 adjacent to the predetermined track, thereby performing one-frame recording on two tracks.

Signals are recorded on the magnetic sheet 22 in the above-described manner as the first and second heads 21a and 21b move along the head moving rail 46. Thus, a number of still images corresponding to 50 tracks in the case of field recording or corresponding to 25 tracks in the case of frame recording can be recorded on the magnetic sheet 22.

The operation of the still video apparatus will now be described with respect to a reproduction mode.

At the time of reproduction, each of the switches S4 to S7 is changed over to establish connection to the terminal a. The boosting ratios of the boosting transformers 25a and 25b are set so that they are maximized with respect to the inner and outer circumferences of the recording area of the magnetic sheet 22 (to $n_1$ and $n_2$ in FIG. 2). For instance, each transformer has 4 turns on the primary side (the side of the head), and 10 and 12 turns on the secondary side; a tap of the winding on the secondary side formed at the tenth turn is connected to the terminal a of the switch S8 or S9 while the end of the winding corresponding to the twelfth turn is connected to the terminal b; the switches S8 and S9 select the terminals a ($n_1=2.5$) when the magnetic heads are located on the side of the outer circumference relative to the twenty-fifth track, or selects the terminals b ($n_2=3$) when the magnetic heads are located on the side of the inner circumference relative to the twenty-fifth track.

Video signals recorded on the magnetic sheet 22 are reproduced by the first and second heads 21a and 21b, are boosted to suitable levels by the first and second transformers 25a and 25b, and are thereafter input into the preamplifier 26. If, at this time, the first and second heads 21a and 21b are located on the side of the outer circumference relative to the twenty-fifth track, each of the switches S8 and S9 establishes connection to the terminal a on the basis of a control signal supplied from the head position detector 47. If the first and second heads 21a and 21b are located on the side of the inner circumference relative to the twenty-fifth track, each of the switches S8 and S9 establishes connection to the terminal b. The capacitances of the resonance capacitors 48a and 48b are set so that the resonant frequencies defined by the inductance of the heads 21a and 21b and the inductance of the transformers 25a and 25b become approximately 7.5 MHz.

If the inductance of the head is $L_h$ and if the leakage inductance of the transformer is negligible while the mutual inductance is much higher than $L_h$, the total inductance of the head and the transformer is represented by $n_2^2 L_h$. If the input capacitance of the preamplifier 26 is $C_A$ and if the floating capacitance is neglected, the total capacitance on the secondary side of the transformer is $C_A + C_i$ ($C_i$ represents the capacitance of the capacitors 48a and 48b).

Let the resonance frequency (7.5 MHz) defined by the above total inductance and total capacitance be $f_{C2}$, and $$f_{C2} = \frac{1}{2\pi \sqrt{n_2^2 L_h (C_A + C_i)}} \quad (2)$$

Therefore, $$C_i = \frac{1}{4\pi^2 f_{C2}^2 n_2^2 L_h} - C_A \quad (3)$$

Figure 5:
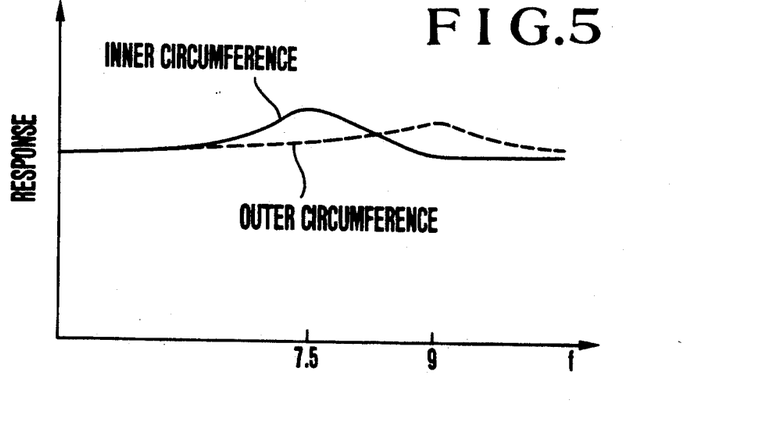
FIG. 5 is a graph of resonance characteristics of the head-transformer system.

As can be understood from expression (2), the resonance frequency $f_C$ is proportional to $1/n$ and, in this embodiment, the ratio of $n_2$ to $n_1$ is 1.2. In consequence, the resonance frequency depending upon $n_1$ is 9 MHz. FIG. 5 shows resonance characteristics of the head-transformer system at the outer and inner circumferences of the recording area of the magnetic sheet.

Since, as described above, the point of resonance of the head-transformer system is in the vicinity of the frequency of the FM modulation carrier of the luminance signal when the head is located on the side of the inner circumference relative to the twenty-fifth track, the signal-to-noise ratio can effectively be improved. When the head is located on the side of the outer circumference relative to the twenty-fifth track, the point of resonance of the head-transformer system is higher than the frequency of the FM modulation carrier of the luminance signal. In this case, however, the coupling coefficient and the insertion loss of the boosting transformer is at preferable levels and, at the same time, the C/N is maximum. The state of reproduction is thereby optimized.

Reproduction RF signals which are picked up from the boosting transformers are amplified by the preamplifier 26 to suitable amplitudes. The luminance signal undergoes amplitude correction in the equalizer 27 and is thereafter demodulated by the FM demodulator 28 so that its high-band components are suppressed by the de-emphasis circuit 29, thereby obtaining the original luminance signal containing the synchronizing signal.

On the other hand, the color-difference FM signal is demodulated by the FM demodulator 30 into a color-difference line-sequential signal, and high-band components thereof are suppressed by the de-emphasis circuit 31, thereby obtaining the original color-difference line-sequential signal.

The luminance signal and the color-difference signals R-Y and B-Y supplied from the de-emphasis circuits 29 and 31 undergo, in the processing circuit 32, skew correction and line interpolation at the time of field reproduction as well as drop-out compensation and processing of making the color-difference line-sequential signal color-difference-line-simultaneous, and are thereafter converted by the NTSC encoder 33 into a TV signal based on the NTSC system, finally being supplied to the output terminal 34.

Figure 6:
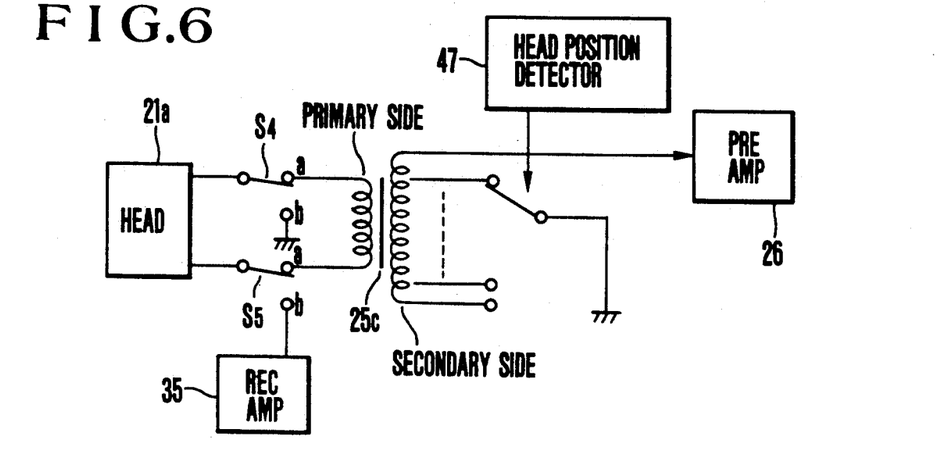
FIGS. 6 and 7 are block diagrams of other examples of the embodiment shown in FIG. 4.
Figure 7:
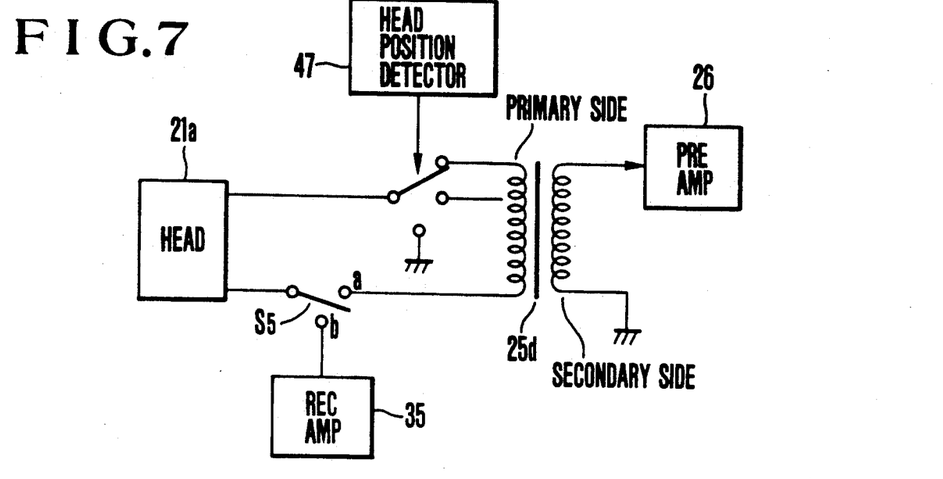

In this embodiment, as described above, the boosting ratio is changed at the twenty-fifth track. However, it may be changed at a different track inside or outside the twenty-fifth track. Also, the change-over of the boosting ratio is not limited to the two-step change between $n_1$ and $n_2$. Instead, a boosting transformer 25c such as that shown in FIG. 6 may be used in which a plurality of taps are provided on the secondary side. (FIG. 6 shows only the channel A.) In this embodiment, the boosting ratio is changed by selecting the number of turns on the secondary side only. However, it is also possible to use another type of boosting transformer 25d, as shown in FIG. 7, in which the number of turns on the primary side can be selected to change the boosting ratio (FIG. 7 shows only the channel A). The present invention can, of course, be applied to a rotary transformer for use in a VTR or the like in which the relative speed between a reproduction head and a magnetic tape varies in different reproduction modes.

As described above, the present invention optimizes reproduction of information signals from the recording medium in response to the relative speed between the reproduction head and the recording medium, thereby greatly improving qualities of reproduced information.

Next, details of a still video apparatus which represents a second embodiment of the present invention will be described.

Figure 8:
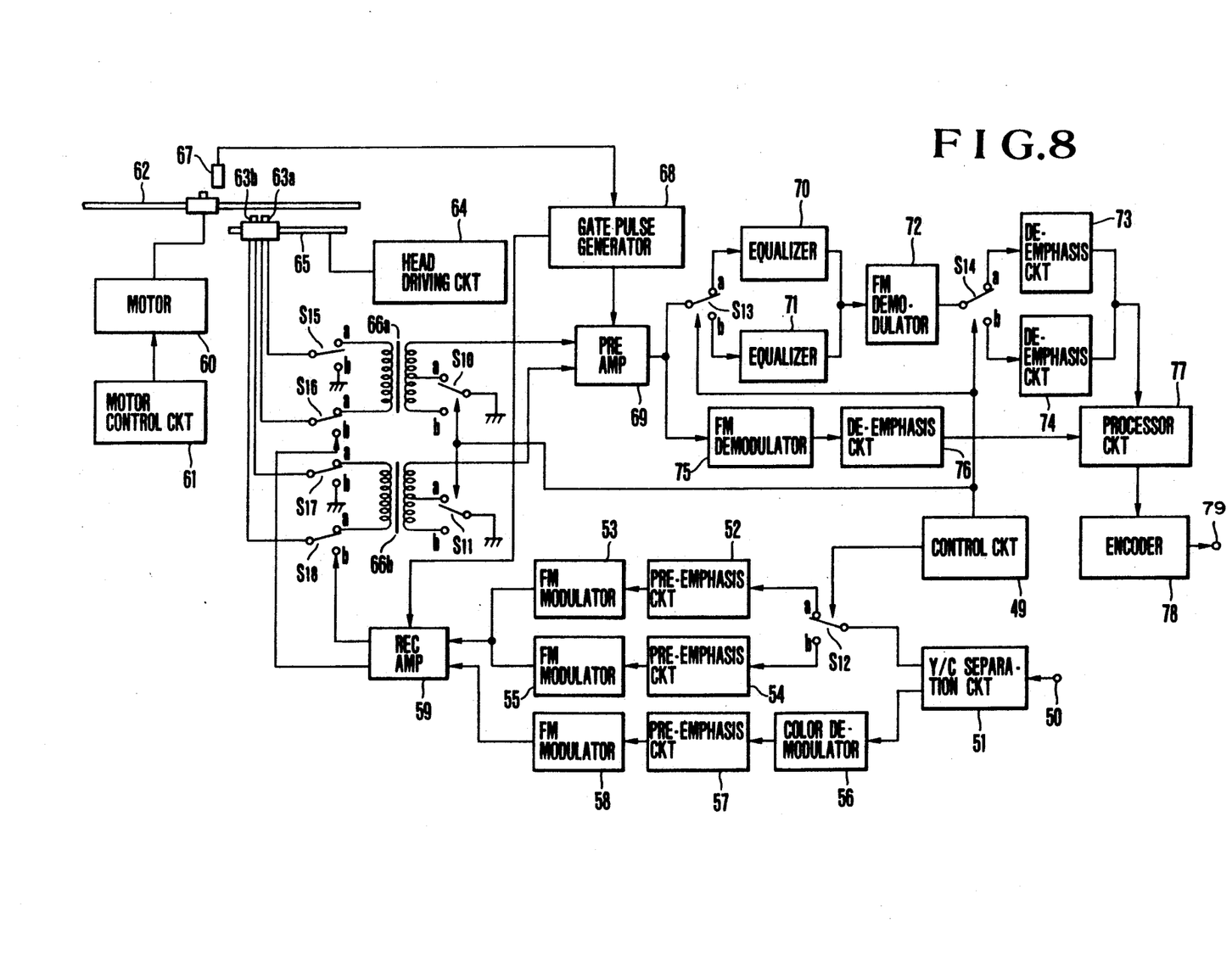
FIG. 8 is a schematic block diagram of a still video apparatus which represents a second embodiment of the present invention.

FIG. 8 schematically shows the construction of the still video apparatus in accordance with the second embodiment, which is designed to record still video information on a magnetic sheet in the form of a disk or reproduce still video information from a magnetic sheet.

A control circuit 49 which performs overall control of the apparatus outputs signals for selecting one of a low-resolution image recording/reproduction mode and a high resolution image recording/reproduction mode to switches S10 to S14. The still video apparatus has an input terminal 50 through which it is supplied with a video signal based on the NTSC system or the like; an Y/C separation circuit 51 which separates a luminance signal (Y+S) containing a synchronizing signal, and a color signal (C) from the video signal; a pre-emphasis circuit 52 for the low-resolution image recording mode; an FM modulator 53 for the low-resolution image recording mode; a pre-emphasis circuit 54 for the high-resolution image recording mode; an FM modulator 55 for the high-resolution image recording mode; a color demodulator 56 which forms two types of differential color signals R-Y and B-Y by demodulation of the carrier chrominance color signal (C) and which converts these color-difference signals into a color-difference line-sequential signal; a color-difference line-sequential signal pre-emphasis circuit 57; a color-difference line-sequential signal FM demodulator 58 which frequency-modulates the color-difference line-sequential signal; a recording amplifier 59; a motor 60 for rotating a magnetic sheet; a motor control circuit 61; a magnetic sheet 62 provided as a magnetic recording medium; and magnetic heads 63a and 63b of a double-gap thin-film type. The magnetic head 63 constitutes a first head for a channel A while the magnetic head 63b constitutes a second head for a channel B. The apparatus also has a drive circuit 64 for moving the heads; a guide rail 65 along which the heads move; a first boosting transformer 66a inserted in the channel A; a second boosting transformer 66b inserted in the channel B; a sheet rotational position detector 67 which detects a PG pin of the magnetic sheet 62 and outputs a detection pulse each time the sheet 62 makes one round; and a gate pulse generator 68 which shapes pulses supplied from the detector 67. The gate pulse generator 68 supplies, during recording, the recording amplifier 59 with gate pulses to switch recording currents each flowing through the magnetic heads 63a or 63b every unit field period. During reproduction, the gate pulse generator 68 supplies, in the case of frame reproduction, the reproduction preamplifier 69 with high- or low-pulses alternately to select the outputs from the magnetic heads 63a and 63b each time the magnetic sheet makes a round, or it supplies, in the case of field reproduction, the reproduction preamplifier 69 with a high- or low-signal to select one of the first field and the second field.

The still video apparatus further has an equalizer circuit 70 for the low-resolution reproduction mode; an equalizer circuit 71 for the high-resolution reproduction mode; a luminance signal FM demodulator 72; a luminance signal de-emphasis circuit 73 for the low-resolution image reproduction mode; a luminance signal de-emphasis circuit 74 for the high-resolution image reproduction mode; a differential color signal FM demodulator 75; a differential color signal de-emphasis circuit 76; a processor circuit 72 which performs skew correction and line interpolation at the time of field reproduction as well as drop-out correction, and an operation of making the color-difference line-sequential signal color-difference-line-simultaneous; an NTSC encoder 78 which forms a TV signal based on the NTSC system from the luminance signal containing the synchronizing signal, and the differential color signals R-Y and B-Y; and a terminal 79 through which the video signal is output.

Recording/reproduction change-over switches S15 to S18 are also provided each of which is changed over to establish connection to a terminal b at the time of recording or to a terminal a at the time of reproduction by a signal supplied from the control circuit 49. The switches S10 to S14 are also controlled by the control circuit 49. The switches S10 and S11 are changed over to the terminals b to set a high boosting ratio in the case of recording or reproduction of a high-resolution video information signal which is frequency-modulated by a high-frequency FM modulation carrier, or they are changed over to the terminal a to set a low boosting ratio in the case of recording or reproduction of a low-resolution video information signal which is frequency-modulated by a low-frequency FM modulation carrier. Details of the operation of these switches will be described later in detail. The switches S12 to S14 are also changed over to the terminals a in the case of recording or reproduction of a low-resolution video information signal or to the terminals b in the case of recording or reproduction of a high-resolution video information signal.

The operation of this embodiment will now be described below. In this case, to simplify the description, it is assumed that the low-resolution image recording/reproduction mode is a recording or reproduction mode in which the luminance signal band of the video signal is about 4.2 MHz as in the case of a TV signal based on the NTSC system while the high-resolution image recording/reproduction mode is a mode in which the luminance signal band is higher.

At the time of recording, a video signal which is input through the input terminal 50 is separated by the Y/C separation circuit 51 into a luminance signal (Y+S) containing a synchronizing signal, and a carrier chrominance signal (C). This separation circuit 51 is constituted by a comb filter or the like in order to maintain an adequate band of a luminance signal Y. If the separated luminance signal designates the low-resonance image recording mode, high-frequency components of this signal are enhanced to a suitable level by being supplied to the pre-emphasis circuit 52 for the low-resolution image recording mode via the switch S12 which has been changed over to the terminal a, and the luminance signal Y+S is frequency-modulated by the FM modulator 53 for low-resolution image recording mode in a frequency deviation having, for example, a sync tip of 6 MHz and a 100% white level of 7.5 MHz. If the separated luminance signal designates the high-resolution image recording mode, high-frequency components of this signal are enhanced by being supplied to the pre-emphasis circuit 54 for the high-resolution image recording mode via the switch S12 which has been changed over to the terminal b, and the luminance signal Y+S is frequency-modulated by the FM modulator 55 for the high-resolution image recording mode in a frequency deviation having, for example, a sync tip of 8 MHz and a 100% white level of 10 MHz. It is possible to employ, in place of the above pre-emphasis circuits, a single emphasis circuit for both the low-resolution and high-resolution recording modes. If, in this case, there is a margin in regard to inversion of the reproduced image in the high-resolution image recording mode, a pre-emphasis circuit in which the extent of emphasis is greater than that of the pre-emphasis circuit for the low-resolution image recording mode may be used in common.

A color signal output from the Y/C separation circuit 51 is demodulated by the color demodulator 56 into differential color signals R-Y and B-Y so that it is converted into a color-difference line-sequential signal consisting of signals R-Y and B-Y which alternately take place every line. The color-difference line-sequential signal is thereafter supplied to the pre-emphasis circuit 57 and undergoes emphasis in this circuit, and the signal is thereafter frequency-modulated by the color-difference line-sequential signal FM modulator 58 while setting, for example, a center frequency of 1.2 MHz and a frequency deviation of 700 KHz with respect to the R-Y signal or setting a center frequency of 1.3 MHz and a frequency deviation of 500 KHz with respect to the B-Y signal.

A luminance FM signal and a color FM signal thereby formed are frequency-multiplexed by the recording amplifier 59 while being respectively amplified to suitable levels, and are supplied for one field period from the recording amplifier 59 to the first and second heads 63a or 63b in the case of frame recording when the recording gate is opened by a signal supplied from the gate pulse generator 68.

The magnetic sheet 62 is rotated at 3,600 rpm by the motor 60 under the control of the motor control circuit 61. During this operation, the motor control circuit 61 is controlled by a signal supplied from the control circuit 49 in such a manner that a certain relationship is established between the phase of the vertical synchronizing signal for the input video signal and the phase of a signal supplied from the rotation detector 67, thereby enabling recording to be always started from the same position on the magnetic sheet 62. The signal from the rotation detector 67 is input into the gate pulse generator 68, and the gate pulse generator 68 outputs, every field, a gate pulse for selecting the first head 63a or second head 63b to the recording amplifier 59 in response to a recording instruction issued by the control circuit 49. The recording amplifier 59 thereby supplies, in the case of frame recording, a recording current for the first field to the first head 63a to effect recording on a predetermined track of the magnetic sheet 62, and then supplies a recording current for a second field to the second head 63b on a track of the magnetic sheet 62 adjacent to the predetermined track, thereby performing one-frame recording on two tracks.

Signals are recorded on the magnetic sheet 62 in the above-described manner as the first and second heads 63a and 63b move along the head guide rail 65. Thus, a number of still images corresponding to 50 tracks in the case of field recording or corresponding to 25 tracks in the case of frame recording can be recorded on the magnetic sheet 62.

Figure 9:
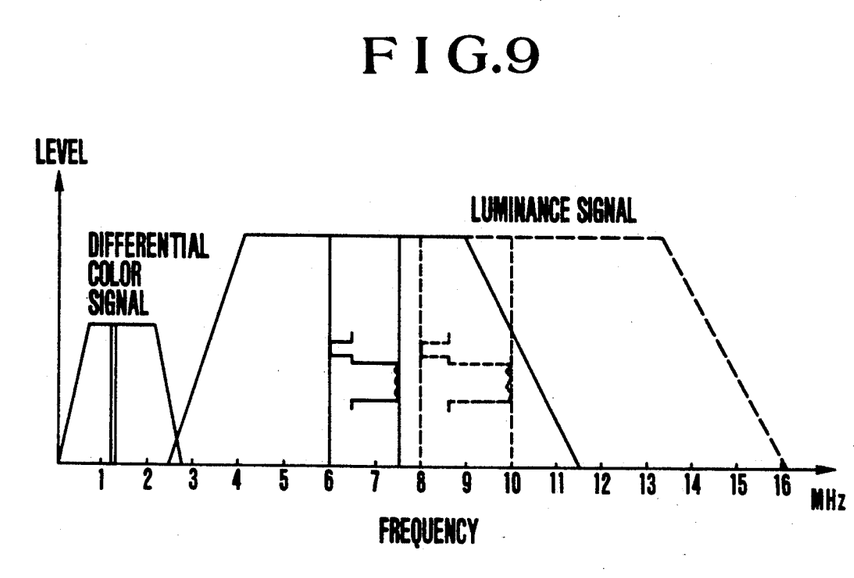
FIG. 9 is a graph of frequency spectra of FM video signals in different frequency bands.

FIG. 9 shows a frequency spectrum of a recording FM signal relating to the low-resolution image recording/reproduction mode (indicated by the solid line) and a frequency spectrum of a recording FM signal relating to the high-resolution image recording/reproduction mode (indicated by the broken line). The recording band of the luminance signal in the low-resolution image recording/reproduction mode is about 4.5 MHz while the recording band of the luminance signal in the high-resolution image recording/reproduction mode is about 6.5 MHz because the frequency of the carrier is heightened by about 2 MHz.

Next, the operation during reproduction will be described below.

At the time of reproduction, each of the switches S15 to S18 is changed over by the control circuit 49 to establish connection to the terminal a. In the case of reproduction of a signal which has been recorded on the magnetic sheet 62 in the low-resolution image recording mode (low-resolution image reproduction mode), each of the switches S10, S11, S13 and S14 is changed over by the control circuit 49 to establish connection to the terminal a.

The operation of each of the first and second boosting transformers 66a and 66b relating to the main features of the present invention will now be described below.

If a head reproduction output is E; the boosting ratio of the boosting transformer is n; the input-conversion noise level of the preamplifier is $N_A$; the level of head impedance noise is $N_h$; and the level of noise including tracing noise and modulation noise generating on the recording medium is $N_m$, the C/N of a reproduction signal obtained from a signal which has been recorded on the recording medium by a single carrier frequency (C: carrier output, and N: the level of noise certain frequency apart from the carrier) is generally represented by $$C/N \propto \frac{nE}{\sqrt{N_A^2 + n^2(N_h^2 + N_m^2)}} \quad (4)$$

$N_A$ and $N_h$ are constant over frequencies ranging from 6 to 10 MHz while $N_m$ becomes smaller with respect to shorter wavelengths or higher frequencies.

Figure 10:
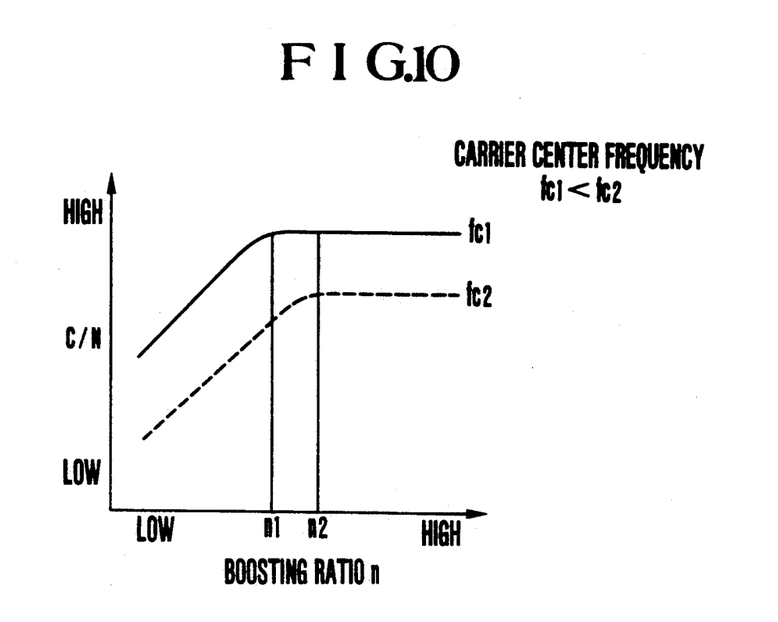
FIG. 10 is a graph of the relationship between the boosting ratio of a boosting transformer and the carrier-to-noise ratio with different carrier center frequencies.

If $N_A$ and $N_h$ are on the same order, for example, they are several 0.1 nv/√Hz, there are different relationships between n and C/N with respect to high and low carrier center frequencies, as those shown in FIG. 10. That is, as can be understood from expression (4) also, if the carrier frequency is low while $N_m$ is high, the C/N begins to saturate at a small value of n and, if the carrier frequency is high while $N_m$ is low, the C/N begins to saturate. In a case where a carrier center frequency $f_{c1}=7$ MHz; a carrier center frequency $f_{c2}=9$ MHz; and the magnetic head is a thin film head having 7 turns, $n_1 \approx 3$, and $n_2 \approx 3.5$.

Consequently, the output tap of the boosting transformer is determined so that the boosting ratio is 3 when the switch S10 or S11 establishes connection to the terminal a or when the low-resolution image reproduction mode is selected and that the boosting ratio is 3.5 when the switch S10 or S11 establishes connection to the terminal b or when the high-resolution-image reproduction mode is selected. The C/N is thereby maximized with respect to each carrier frequency.

Video signals which have been reproduced from the magnetic sheet 62 by the magnetic heads 63a and 63b are boosted by the boosting transformers 66a and 66b and are input into the preamplifier 69. The luminance FM signal in the reproduction video signals amplified by the preamplifier 69 to suitable amplitudes undergoes amplitude correction with respect to the sideband in the equalizer circuit 71 for the high-resolution image reproduction mode (in the high-resolution image reproduction mode) or in the equalizer circuit 70 for the low-resolution image reproduction mode (in the low-resolution image reproduction mode). This FM signal is thereafter demodulated by the FM demodulator 72, undergoes high-frequency suppression in the de-emphasis circuit 74 (for high-resolution image reproduction mode) or in the de-emphasis circuit 73 (for low-resolution image reproduction mode) with a processing characteristic reverse to that in the recording, thereby obtaining the original luminance signal (Y+S) containing the synchronizing signal.

On the other hand, the differential color FM signal in the reproduction video signal is demodulated by the FM demodulator 75 into differential color signals R-Y and B-Y, and high-frequency components thereof are suppressed by the de-emphasis circuit 76, thereby obtaining the original differential color signals R-Y and B-Y.

The luminance signal and the differential color signals R-Y and B-Y supplied from the de-emphasis circuits 73, 74, and 76 undergo, in the processing circuit 77, skew correction and line interpolation at the time of field reproduction as well as drop-out compensation and processing of making the color-difference signals color-difference-line-simultaneous, and are thereafter converted by the encoder 78 into a TV signal based on the NTSC system, finally being supplied to the output terminal 79.

Figure 11:
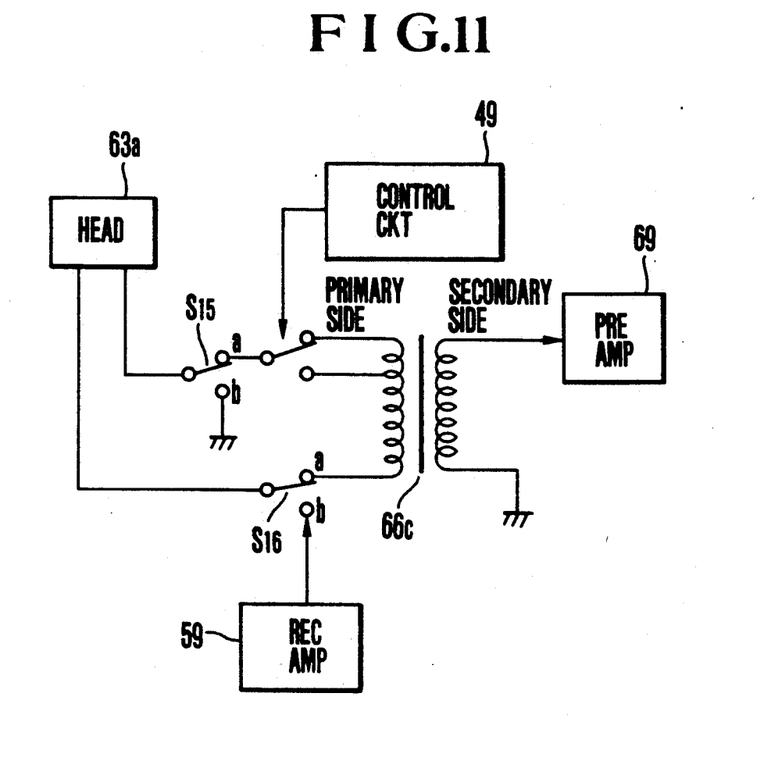
FIGS. 11 and 12 are block diagrams of circuit arrangements relating to other examples of the boosting transformer used in the embodiment shown in FIG. 8.

In this embodiment, as described above, the boosting ratio is changed by selecting the number of turns on the secondary side of the boosting transformer. However, it is also possible to use a different type of boosting transformer 66c, as that shown in FIG. 11, in which the number of turns on the primary side can be selected to change the boosting ratio. (FIG. 11 shows only the channel A.)

Figure 12:
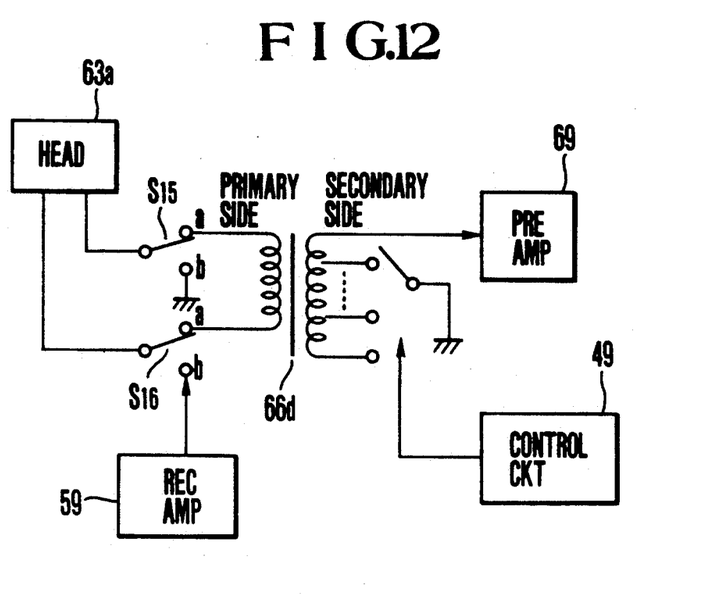

In this embodiment, the carrier frequency is set to two different frequencies. However, it is also possible to set the carrier frequency to more than two frequencies. In that case, a boosting transformer 66d such as that shown in FIG. 12 may be used which is provided in such a manner that a boosting ratio at which the C/N at the center frequency of each carrier begins to saturate is obtained; and the transformer is designed to select one of a plurality of boosting ratios thereby obtained. (FIG. 12 shows only the channel A.)

In accordance with the present invention, as described above, it is possible to reproduce, with high signal-to-noise ratios, a plurality of FM-modulated information signals in different frequency bands.

What is claimed is:

1. An information signal reproducing apparatus for reproducing, from a disk-like recording medium, information signals recorded on recording tracks formed on said disk-like recording medium, said information signal reproducing apparatus comprising:
   (A) reproduction head means, capable of tracing the recording tracks of said disk-like recording medium, for reproducing an information signal recorded on each recording track of said disk-like recording medium and outputting the information signal thereby reproduced;
   (B) head moving means for moving said reproduction head means to a desired position in the radial direction of said disk-like recording medium;
   (C) boosting means having a plurality of boosting ratios, for boosting the information signal reproduced by the reproduction head means;
   (D) head position detecting means for detecting the position of said reproduction head means on a radius of said disk-like recording medium and outputting a head position information signal;
   (E) relative speed information detecting means for detecting changes in the speed of said reproduction head means relative to said recording medium when said reproduction head means traces the tracks of said recording medium, said relative speed information detecting means outputting relative speed information in correspondence with the detected relative speed;
   (F) boosting ratio changing means for changing, in response to the relative speed information output from said relative speed information detecting means, the ratio at which the information signal is boosted by said boosting means, wherein said boosting ratio changing means includes change-over means for selecting the boosting ratio of said boosting means in response to the head position information signal output from said head position detecting means.

2. An information signal reproducing apparatus according to claim 1, wherein said boosting means includes a transformer having a primary coil connected to a stage which is formed in front of said transformer and to which said reproduction head means is connected, and a secondary coil connected to a stage which is formed at the rear of said transformer and to which signal amplifying means is connected, said secondary coil having at least one intermediate tap, and wherein said change-over means is arranged to connect said secondary coil of said transformer to said signal amplifying means in response to the head position information signal output from said head position detecting means so that a portion of said secondary coil having a number of turns corresponding to the position of said reproduction head means on a radius of said disk-like recording medium detected by said head position detecting means is connected to said signal amplifying means.

3. An information signal reproducing apparatus according to claim 1, wherein said boosting means includes a transformer having a primary coil having at least one intermediate tap and connected to a stage which is formed in front of said transformer and to which said reproduction head means is connected, and a secondary coil connected to a stage which is formed at the rear of said transformer and to which signal amplifying means is connected, and wherein said change-over means is arranged to connect said primary coil of said transformer to said reproduction head means in response to the head position information signal output from said head position detecting means so that a portion of said primary coil having a number of turns corresponding to the position of said reproduction head means on a radius of said disk-like recording medium detected by said head position detecting means is connected to said reproduction head means.

4. An information signal reproducing apparatus for reproducing from a recording medium a plurality of types of information signals which are recorded on said recording medium after they have been respectively frequency-modulated by a pluraluty of carrier frequency signals of different frequencies, said information signal reproducing apparatus comprising:
   (a) reproduction head means for reproducing the plurality of types of information signals recorded on said recording medium;
   (b) a transformer having a primary coil connected to a stage which is formed in front of said transformer and to which said reproduction head means is connected, and a secondary coil connected to a stage which is formed at the rear of said transformer and to which signal amplifying means is connected, said secondary coil having at least one intermediate tap, for boosting the plurality of types of information signals reproduced by said reproduction head means;

(c) reproduction mode designation means for outputting, as desired, a reproduction mode designation signal to designate the frequency type of each information signal reproduced from said reproduction head means; and (d) change-over means for connecting said secondary coil of said transformer to said signal amplifying means in response to the reproduction mode designation signal output from said reproduction mode designation means so that a portion of said secondary coil having a number of turns corresponding to the type of each information signal reproduced by said reproduction head means designated by said reproduction mode designation means is connected to said signal amplifying means.

5. An information signal reproducing apparatus according to claim 4, wherein the plurality of types of video signals each containing luminance signals contained in the plurality of types of video signals have been respectively frequency-modulated by a plurality of carrier frequency signals of different frequencies.

6. An information signal reproducing apparatus according to claim 5, further comprising a plurality of types of signal processing means for processing the plurality of types of video signals which have been boosted by said transformer, wherein one of said plurality of types of signal processing means which corresponds to the reproduction mode designation signal output from said reproduction mode designation means is connected to said transformer.

7. An information signal reproducing apparatus according to claim 6, wherein each signal processing means includes an equalizer circuit.

8. An information signal reproducing apparatus according to claim 6, wherein each signal processing means includes a de-emphasis circuit.

9. An information signal reproducing apparatus according to claim 6, wherein said recording medium includes a disk-like recording medium.

10. An information signal reproducing apparatus for reproducing, from a recording medium, a plurality of types of information signals which are recorded on said recording medium after they have been respectively frequency-modulated by a plurality of carrier frequency signals of different frequencies, said information signal reproducing apparatus comprising:

(a) reproduction head means for reproducing the plurality of types of information signals recorded on said recording medium;

(b) a transformer having a primary coil having at least one intermediate tap and connected to a stage which is formed in front of said transformer and to which said reproduction head means is connected, and a secondary coil connected to a stage which is formed at the rear of said transformer and to which signal amplifying means is connected, for boosting the plurality of types of information signals reproduced by said reproduction head means;

(c) reproduction mode designation means for outputting, as desired, a reproduction mode designation signal to designate the frequency type of each information signal reproduced from said reproduction head means; and (d) change-over means for connecting said primary coil of said transformer to said reproduction head means in response to the reproduction mode designation signal so that a portion of said primary coil having a number of turns corresponding to the type of each information signal reproduced by said reproduction head means designated by said reproduction mode designation means is connected to said reproduction head means.

11. An information signal reproducing apparatus according to claim 10, wherein the plurality of types of video signals each containing luminance signals contained in the plurality of types of video signals have been respectively frequency-modulated by a plurality of carrier frequency signals of different frequencies.

12. An information signal reproducing apparatus according to claim 11, further comprising a plurality of types of signal processing means for processing the plurality of types of video signals which have been boosted by said transformer, wherein one of said plurality of types of signal processing means which corresponds to the reproduction mode designation signal output from said reproduction mode designation means is connected to said transformer.

13. An information signal reproducing apparatus according to claim 12, wherein each signal processing means includes an equalizer circuit.

14. An information signal reproducing apparatus according to claim 12, wherein each signal processing means includes a de-emphasis circuit.

15. An information signal reproducing apparatus according to claim 12, wherein said recording medium includes a disk-like recording medium.

* * * * *

UNITED STATES PATENT AND TRADEMARK OFFICE
CERTIFICATE OF CORRECTION

PATENT NO. : 5,296,978
DATED : March 22, 1994
INVENTOR(S) : Tokihiko Ogura

It is certified that error appears in the above-indentified patent and that said Letters Patent is hereby corrected as shown below:

Item 63, line 2, change "239,790" to -- 739,790 --.

Col. 2, line 55, change "adopted" to -- adapted --.

Col. 3, line 45, change "provided" to -- provide --.

Col. 5, line 30, change "liminance" to -- luminance --.

Col. 5, lines 30, 31, 32, 33, change "an" to -- a --.

Col. 5, line 37, change "dignal" to -- signal --.

Col. 9, line 5, change "an" to -- a --.

Col. 14, line 57, change "plurialuty" to -- plurality --.

Signed and Sealed this

Thirtieth Day of August, 1994

Attest:

BRUCE LEHMAN

Attesting Officer          Commissioner of Patents and Trademarks